April 28, 1931. C. W. VALENTINE ET AL 1,803,045
DRIVING MECHANISM FOR PAPER MAKING MACHINES
Filed July 19, 1930   3 Sheets-Sheet 3
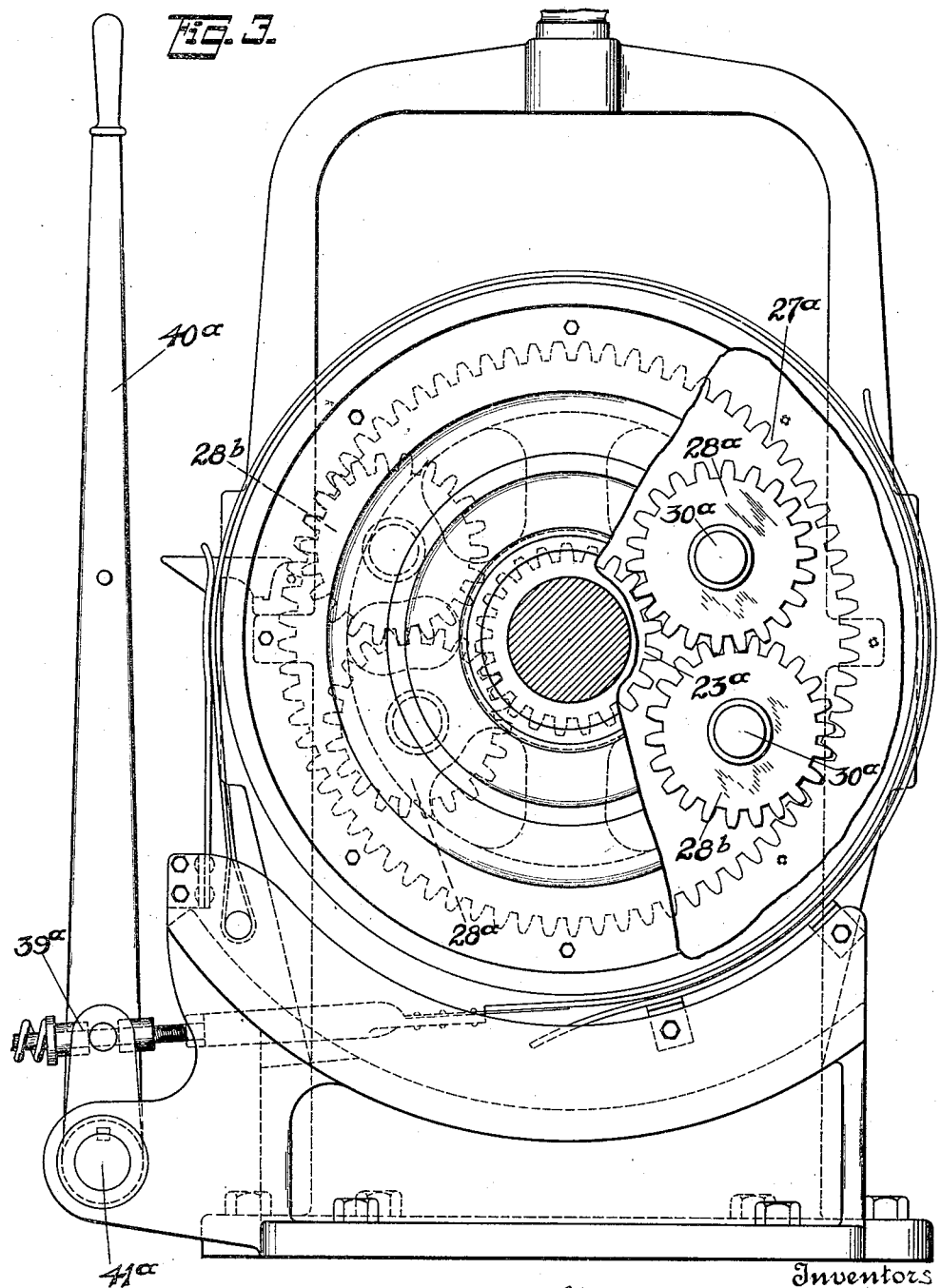

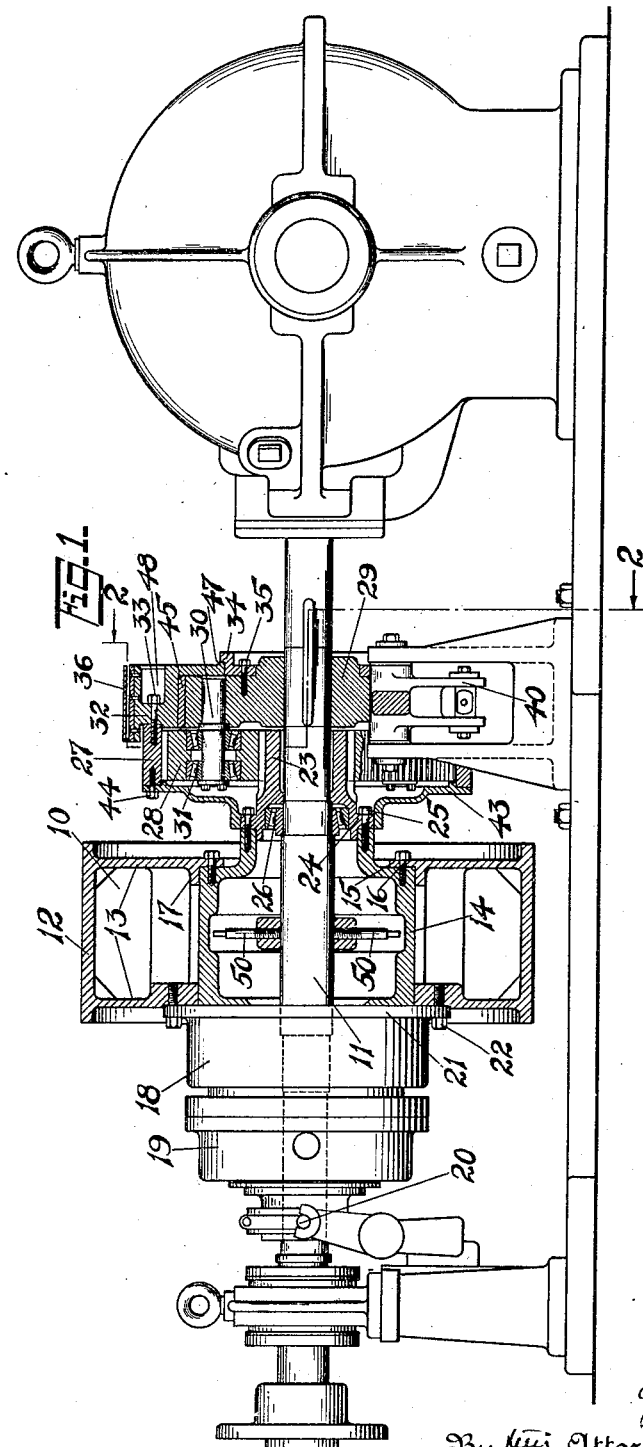

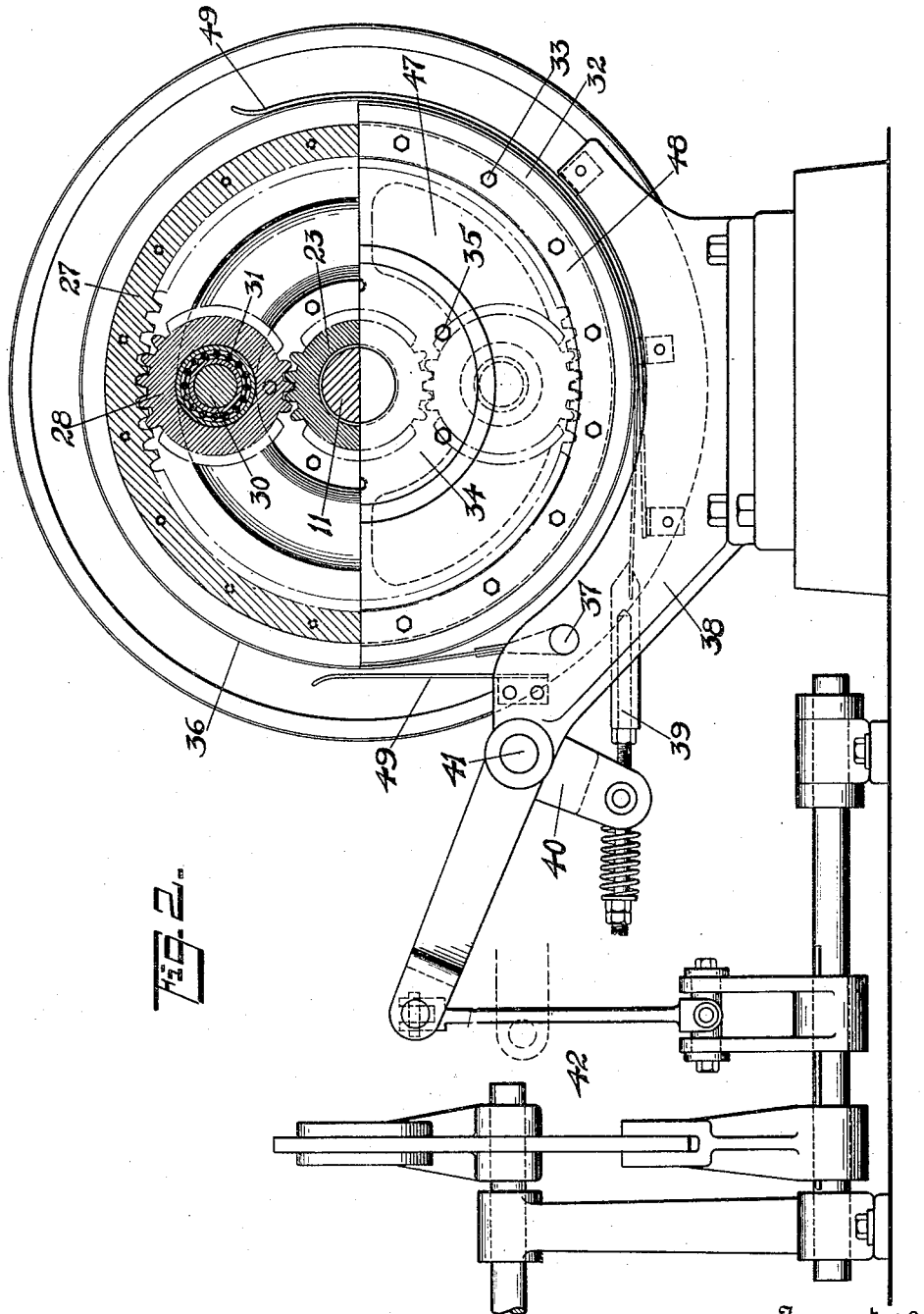

Patented Apr. 28, 1931

1,803,045

UNITED STATES PATENT OFFICE

CHARLES W. VALENTINE AND PETER N. OTTERSLAND, OF WATERTOWN, NEW YORK, ASSIGNORS TO THE BAGLEY AND SEWALL COMPANY, OF WATERTOWN, NEW YORK, A CORPORATION OF NEW YORK

DRIVING MECHANISM FOR PAPER-MAKING MACHINES

Application filed July 19, 1930. Serial No. 469,025.

This invention relates to a driving mechanism for paper machines.

The different parts of a paper machine such as the Fourdrinier, presses, dryer section, calenders, etc., are now commonly driven from a constant speed line shaft extending the length of the machine, the parts being individually driven by some form of geared drive belted from the shaft. In the case of some parts, particularly the dryer section, there is a very heavy starting load; consequently, when the line shaft is running at its normal speed, the pick-up of a section means heavy strain and heavy wear on the starting clutch of the drive. Furthermore, it is sometimes desirable to run the section quite slowly for putting on new felts or for other reasons, and to do this, requires clutch slippage, resulting in extensive wear and injury thereto. To provide for slow running, many devices have been resorted to, such as entirely separate reduction gears with independent motor drive. These devices have been usually rather complicated and more or less expensive to install and maintain.

It is an object of the invention to provide a simple and practical drive for a paper machine which may function to reduce speed and also, by modification in construction, to reduce and reverse speed to the driven part of the machine.

With these general objects in view, the invention consists in the features, combinations, details and arrangements which will be described first in connection with the accompanying drawings and then more particularly pointed out.

In the drawings:—

Figure 1 is a side elevation of a complete drive unit, showing parts in cross-section;

Figure 2 is an end sectional view taken as on line 2—2 of Figure 1; and

Figure 3 is a view similar to Figure 2 of a modification for obtaining speed reversal.

The mechanism generally includes a rotary driving member or pulley, a clutch and a transmission. These elements are arranged on a shaft in a combination such that the pulley may drive the shaft either through the clutch or through the transmission or the pulley may run idly on the shaft without driving the shaft.

The particular mechanism selected to illustrate the invention includes a pulley 10 positioned on a shaft 11. In this particular application of the invention, this shaft is operated by the constant speed shaft of a paper machine and is shown geared to a part of the paper machine. As here shown, this pulley is advantageously constructed in two parts, an outer part comprising integrally formed rim 12 and spokes in the form of disks 13 and an inner part comprising a large hollow hub 14 situated on the shaft and having free bearing thereon. In the embodiment, there are two disks 13, one near each edge of the rim and equally spaced inwardly from said edge. These parts are fastened rigidly to form the pulley. To this end, as here shown, one disk extends partially along one end of the hub as at 15 and is attached thereto by suitable fastening members, such as cap-screws 16. This disk is advantageously provided with inward axial projections which may be in the form of an inwardly extending circular flange 17 seating on the periphery of the hub. The other disk seats on the hub periphery at its other end and provides, with the hub end, a surface for attachment of a clutch. This clutch may be of any preferred or desired construction and is indicated here generally as having a part 18 attached to the pulley and a part 19 attached to the shaft, said parts being adapted to be coupled or uncoupled by appropriate mechanism 20 to connect or disconnect the pulley and the shaft. In the exemplification, part 18 has a peripheral flange 21 attached to the pulley disk by bolts 22 or the like.

The transmission exemplified is of the planetary type and is attached to and driven from the pulley hub on the side opposite the clutch. In the embodiment, the transmission comprises a center or sun gear 23 placed unattached on the shaft and having an axial extension 24 forming a recessed seat for the end of the pulley hub and supporting said hub in spaced centered relation from the shaft, said extension being fastened to the hub end by cap screw 25. The bearings for the pulley hub and center gear are advantageously of the frictionless type, for example, roller bearings. As here shown, one bearing 26 may be common to the center gear and hub and, to this end, may fit in a recess in the gear extension (Fig. 1). The transmission also has a ring or annular gear 27 with internal teeth and planetary gears 28 between and in mesh with the teeth of the sun and ring gears. The hub 29 of the transmission is fixed or keyed to the shaft. This hub carries laterally extending trunnions 30 on which the planetary gears are positioned and free to revolve, having frictionless bearings thereon, for example, roller bearings 31. Around the periphery of the transmission hub is a ring member 32 which is free to revolve around the hub and has a suitable sliding bearing 45 thereon but is affixed to said ring gear as by cap screws 33 set in a circular recess 48 in the ring member. This ring member is guided by an internal extension 47 having a circular sliding way in guide member 34 attached to the side of the hub opposite the gears as by cap screws 35. Surrounding the ring member is a brake band 36 which may be tightened or loosened to hold the ring member or to permit freedom for its rotation. As here shown, the band is fixed at one end by a stationary pin 37 carried by a standard 38, encircles the ring member and has at its free end an adjustable spring connection 39 (Fig. 2) with the end of one arm of a bell crank lever 40 which is pivoted at its apex as by pin 41 to the standard. The free end of the other lever arm is connected to a hand-operated mechanism 42 (any suitable system of levers or the like) for applying a tightening or loosening movement to the bell-crank, hence to the band. Leaf springs 49 carried by the standard bear against the band periphery to hold the band concentric and to produce a uniform loosening and tightening of the band or the ring periphery. The gears of the transmission are preferably concealed by a plate or disk 43, attached to the ring gear by cap screws 44 or the like and riding freely on the sun gear extension.

In the exemplification, the hollow pulley hub functions as a reservoir for lubricant for oiling the bearings. In the mechanism illustrated for the purpose, there is a deflecting arm or arms 50 within the hollow hub and fixed to the shaft. When the shaft is stationary and the pulley revolving idly on it, the arms being stationary, act to deflect the revolving lubricant to the bearings, thus oiling them when they are in action as bearings. When the shaft and pulley turn together and the bearings are not functioning as such and do not require oiling, the arms turn with the shaft and with the revolving lubricant and do not function as deflectors.

In operation, the pulley may drive the shaft at the same speed direct through the clutch or at a reduced speed through the transmission or the pulley may run idly on the shaft. In the latter case, the clutch is out or uncoupled. When the pulley is running idly or freely on the shaft, the center gear revolves with it and rotates the planetary gears which in turn rotate the ring gear and ring member 32 fastened to it, all of these parts being free to revolve without transmitting any motion to the shaft since the brake band is loose. To obtain the drive through the transmission, the brake band is tightened on the ring member, and holds said member and the ring gear stationary whereupon the planetary gears travel on the interior of the ring gear and impart rotation to the transmission hub 29, consequently to the shaft. The shaft is thus rotated at a fixed ratio of speed relative to the pulley, the ratio depending upon the predetermined relation of the gears used in the transmission. To obtain the drive direct through the clutch, the clutch is coupled and the brake band is released. The entire planetary transmission then revolves as a unit with the pulley and the shaft and acts as a small fly-wheel.

In the embodiment shown in Figure 3, the planetary transmission is substantially similar to that described except that the drive from the sun gear to the ring gear is through a gear train comprising a series of two gears, $28^a$, $28^b$, instead of a single gear 28 as in the first embodiment, these gears being mounted on shafts $30^a$ as in the first case. The drive is from the sun gear $23^a$, gear $28^a$, gear $28^b$ to the ring gear $27^a$. The result is that the ring gear is rotated in a direction reverse to that of the pulley and rotates the shaft in the same reverse direction. Hence, in this modification of the invention, the transmission functions not only to reduce speed from the pulley to the shaft but also to reverse direction of rotation of the shaft relative to the pulley driving it. In the structure shown, other details of construction differ somewhat from the specific construction of the first embodiment. For example, the end of the brake band has an adjustable resilient connection $39^a$ directly with a hand-operated lever $40^a$, pivoted on the standard at $41^a$. With the exception noted, the mode of operation of this embodiment is similar to that of the first exemplification.

This reversing gear has a special application in a drive for a stack of calender rolls where occasionally the rolls clog with wads of paper and are more easily freed and cleared by running the rolls backward.

What is claimed is:

A driving unit for a paper machine comprising a shaft, a pulley loosely positioned thereon, a pair of cooperating clutch members on one side of said pulley, one of which is secured to said shaft and the other of which is detachably connected to said pulley, a planetary transmission connected to the other side of said pulley and said shaft including a sun gear rotatable on said shaft and having an extension detachably connected to said pulley, an orbit gear, a planetary carrier fixed on said shaft planetary gears carried thereby and cooperating with said sun and orbit gears, a braking ring fixed to said orbit gear enclosing and having a peripheral bearing on said carrier, and a guide member cooperating with said braking ring and detachably connected to said carrier.

In testimony whereof, we have hereunto set our hands.

CHARLES W. VALENTINE.
PETER N. OTTERSLAND.